United States Patent

Nemoto et al.

[19]

[11] Patent Number: 6,011,879

[45] Date of Patent: *Jan. 4, 2000

[54] OPTICAL CHARACTER RECOGNITION SYSTEM AND METHOD USING SPECIAL NORMALIZATION FOR SPECIAL CHARACTERS

[75] Inventors: Naoyuki Nemoto, Yamato; Hiroyasu Takahashi, Yokohama, both of Japan

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/805,196

[22] Filed: Feb. 27, 1997

[30] Foreign Application Priority Data

Feb. 27, 1996 [JP] Japan ................................. 8-039740

[51] Int. Cl.[7] ..................................................... G06K 9/32
[52] U.S. Cl. ........................................... 382/301; 382/298
[58] Field of Search ..................................... 382/301, 298, 382/290, 174–177, 187–189, 209, 218, 296; 395/102, 110, 109; 345/127–131, 439, 467; 348/561, 581, 582, 704

[56] References Cited

U.S. PATENT DOCUMENTS 3,784,981   1/1974   Borowski, Jr. et al. ................ 382/301
4,977,602  12/1990   Beato ........................................ 382/298
5,033,097   7/1991   Nakamura ................................ 382/174
5,537,489   7/1996   Sinden et al. ........................... 382/187
5,566,252  10/1996   Miyaza ..................................... 382/298
5,715,336   2/1998   Tanaka ..................................... 382/301

FOREIGN PATENT DOCUMENTS

1817562   3/1993   Japan ............................... G06K 9/42

*Primary Examiner*—Leo H. Boudreau
*Assistant Examiner*—Ishrat Sherali
*Attorney, Agent, or Firm*—A. P. Tennent; Karl O. Hesse

[57] ABSTRACT

Character normalization is accomplished using a scaling program. Data input to a scaling program are character images and character parameters (height of result buffer frame, character height, character width and character location), and parameters calculated for scaling (the size of a normalized portion to be output; and the top and bottom and the left and right hand spaces of a normalization pattern to be output). In the present invention, normalization is performed by adjusting the parameters, without especially changing the processing flow. A threshold value is provided in accordance with the size and the location of an input character in order to change a calculation method for parameters that are to be transmitted to the scaling program. Since the values at the boundary of the threshold value are continuous, no discontinuity appears in a resultant normalized image that covers the range from small characters to large characters, and seamless normalization is therefore accomplished.

4 Claims, 7 Drawing Sheets

FIG. 1

Scaling (example in x direction)

FIG. 5B Parameter calculation flow in seamless normalization process (output pattern: 24 x 16)

FIG. 6

Original Image

FIG. 7

¥123000　¥¥598　¥9800000
¥5670　-67　-11/23¥
()>:;!'ｲ甲¥¥%&ニｔ-[]/?0/23¥56789
-0/23¥56789-{}<>ﾉ◐●()!;□■ニｼﾞ゛ﾋ゛ﾍ
>/0/23¥56789-0/23¥56789-ABCDEF
GHIJKLMNOPQRSTUVWXYZABCDEFGHIJ
KLMNOPQRSTUVWXYZアイウエオカキクケコサシスセソ
ソタチツテトナニヌネノハヒフヘホマミムメモヤユヨラリルレロワ
ｦﾝ　ガｰ●ﾋﾞゲゴザジズゼソﾀﾞﾁﾞヅデドバビブベポﾟピﾟプﾟペﾟ
ぁあいぅえぉ⦁ぎぐげこさしすせそたちつてとなにぬねのはひふへほ

Normalization result by conventional method

☐ Please note
＿ underlined blocks

FIG. 8

OPTICAL CHARACTER RECOGNITION SYSTEM AND METHOD USING SPECIAL NORMALIZATION FOR SPECIAL CHARACTERS

BACKGROUND OF THE INVENTION

1. Field of the Invention

The present invention is a system and method for optical character recognition (OCR) which uses normalization of the character sizes. The normalization of the character sizes is performed, in pre-processing for character recognition, by converting characters having a variety of sizes into characters having a determined size in order to improve the character recognition rate.

2. Prior Art

For character recognition (particularly, pattern matching), some method is employed to normalize characters. When all characters are merely fully normalized into a predefined result buffer, however, a period ".", the numeral one "1" and a hyphen "_" all appear as black blocks. These specific characters, which are written especially small, must be smaller than the other common characters after normalization is performed. Further, when the aspect ratio (a value obtained by dividing a character height by a character width) is maintained constant, the same type of characters may be difficult to match depending on whether they are written bold or thin. When characters are normalized in a center location, an underscore "_" and a hyphen "_" are indistinguishable.

According to a conventional normalization method, when the height or the width of a character exceeds a specific threshold value, the longer axis of the character is adjusted to the maximum value of the result buffer, and the other axis is so normalized in the center of the buffer as to maintain the aspect ratio. Using this method, a difference in the aspect ratios of even like characters causes the mismatching of patterns, so that even like characters tend to be recognized as different characters, or different characters having the same shape but being positioned at different locations tend to be recognized as being identical character types.

In order to recognize characters ranging from normal sizes to small sizes, a "character recognition system" was proposed in Japanese Patent No. 1817562 owned by International Business Machines Corporation. A portion of that system is illustrated by the Figures in this application.

SUMMARY OF THE INVENTION

According to the present invention, a character image and a character parameter are provided to provide seamless normalization for a scaling program that actually reduces and enlarges the sizes of characters, and normalization is performed by adjusting the parameters, without especially changing the processing flow. Data input to a scaling program are character images and character parameters (height of result buffer frame, character height, character width and character location), and parameters calculated for scaling (the size of a normalized portion to be output; and the top and bottom and the left and right hand spaces of a normalization pattern to be output).

A threshold value is provided in accordance with the size and the location of an input character in order to change a calculation method for parameters that are to be transmitted to the scaling program. Since the values at the boundary of the threshold value are continued, no discontinuity appears in a resultant normalized image that covers the range from small characters to large characters, and seamless normalization is therefore accomplished.

It is one object of the present invention to provide a seamless normalization method that prevents normalization results for special characters, which are written particularly small, and for ordinary characters from differing greatly due to slight differences in character sizes or character locations.

It is another object of the present invention to increase the character recognition rate by performing the seamless normalization of characters, ranging from special characters to ordinary characters.

Other objects and advantages of the present invention will be apparent to those skilled in the art in view of the following description of the preferred embodiment.

DETAILED DESCRIPTION OF PREFERRED EMBODIMENT

Figure 1:
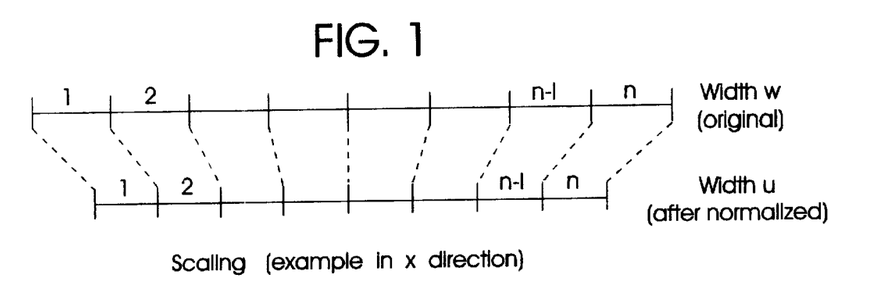
FIG. 1 is a diagram showing scaling in x direction.
Figure 2:
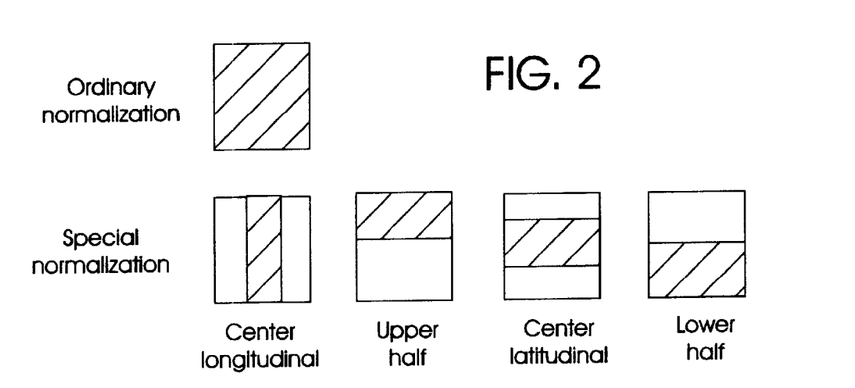
FIG. 2 is a diagram illustrating a normalization processing pattern for a conventional technique.

The character normalization method according to this system will now be described. This method is performed by scaling an original character image. As is shown in FIG. 1, the scaling comprises a process by which a character image having a width w is divided into n equal segments and is converted to an image having a width u. For scaling in direction y, height h of a character is converted to height g. Normalization is performed by scaling in direction x and in direction y; however, when characters are fully normalized into a predefined result buffer (width: u and height: g), small special characters, such as ".", "1" and "_", all appear as black blocks. In this normalization process, therefore, depending on the locations and the sizes of characters, different normalization methods are employed to avoid the provision for a small character of a normalization pattern from being excessively large. In this normalization method, "center of gravity" and a "aspect ratio" are acquired as parameters from an input character, and processing is performed separately for "ordinary normalization" and "special normalization". For the "special normalization", as is shown in the bottom of FIG. 2, when a character is equal to or smaller than a specific threshold, relative to a result buffer frame, a normalization pattern is set for center longitudinal, upper-half, center latitudinal, or lower-half normalization. This pattern is then normalized within a small, fixed size, shaded area, as in FIG. 2. In this manner, small characters can be correctly normalized.

With this method, however, since processing is separated by a determined threshold value even for a slight difference in the size of characters, a discontinuity (a seam) appears in the normalized character. For example, when a character such as "=", for which the size is varied by a writer or by characters that precede and follow it, falls below and above the threshold value, as a result, because of a slight difference in the size of the character, either an "ordinary normalization" pattern or a "special normalization" pattern is obtained for the character. Further, the location after the character normalization is also separated by the threshold value as a boundary. Such a discontinuity is not desirable from the point view of character recognition.

A seamless normalization system is required, whereby most ordinary characters are fully adjusted in a character result buffer at a fixed aspect ratio. For characters that are written especially lightly (vertically or horizontally), their aspect ratios are maintained; for small characters or for characters that are positioned especially low, information concerning their locations is taken into consideration; and for all characters, from the small to the common size, the sizes are gradually changed. In addition, it is necessary to increase a character recognition rate for special characters that are written particularly small.

Figure 3A:
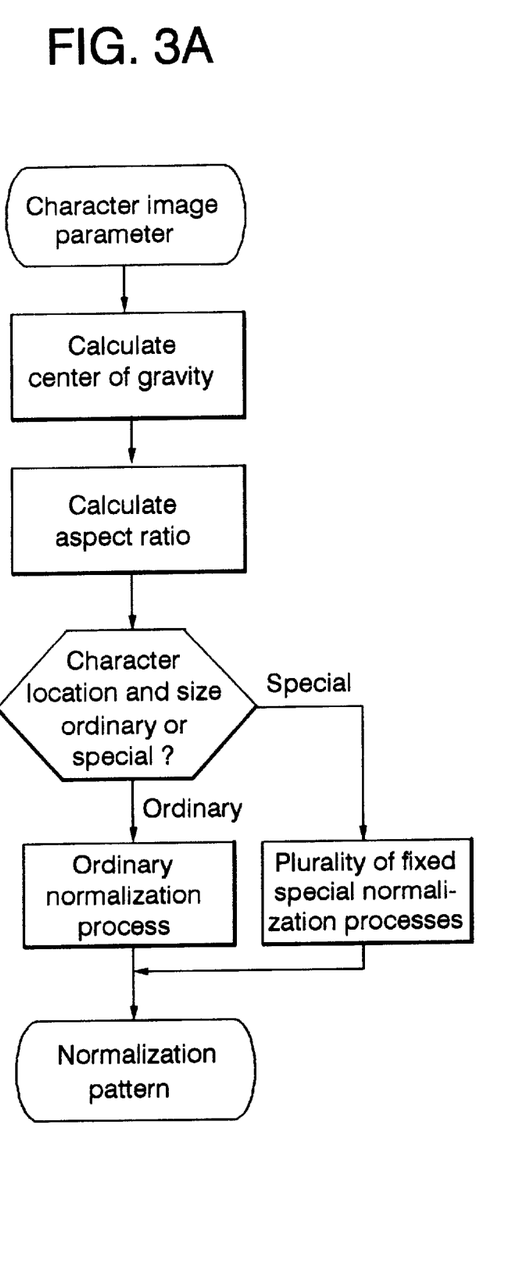
FIG. 3 is a diagram showing a difference between a conventional normalization processing flow and the seamless normalization processing flow of the present invention.
Figure 3B:
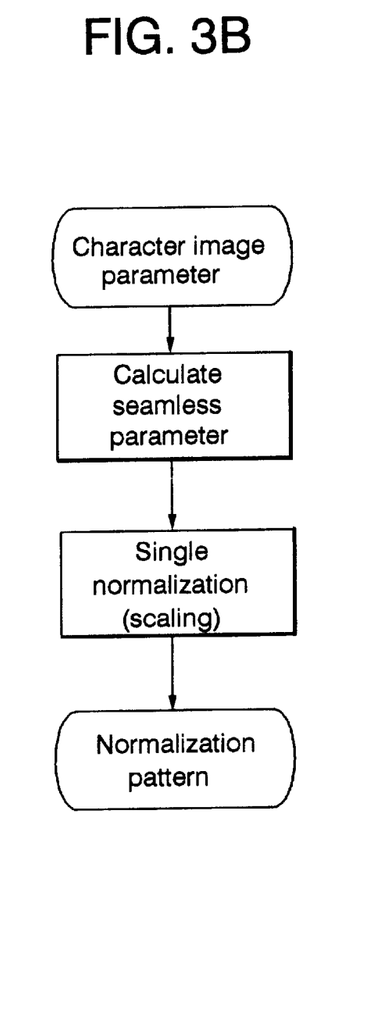

As is shown on the left in FIG. 3, according to the conventional normalization method, separate normalization methods, "ordinary normalization" and "special normalization", are employed, depending on the locations and the sizes of the characters, in order to avoid the normalization pattern for a small character from being excessively large. With this method, however, since a normalization pattern varies depending on slight difference in character size or character location, small characters and large characters can not be seamlessly normalized.

Figure 4:
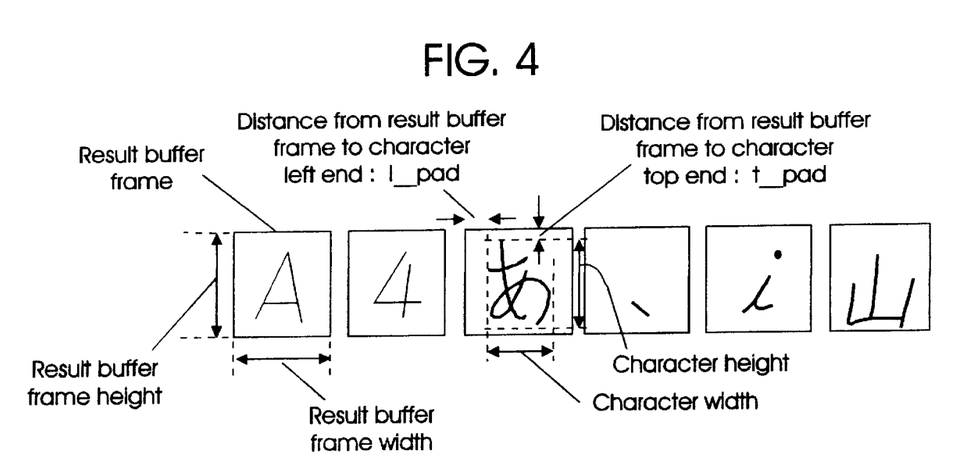
FIG. 4 is a diagram illustrating character parameters for the normalization process.

On the other hand, as is shown on the right in FIG. 3, according to the present invention, a character image and character parameters are provided for a scaling program that actually performs reduction and enlargement, and seamless normalization is thus performed by adjusting the parameters without especially altering the processing flow. As is shown in FIG. 4, the parameters for seamless normalization are the height of a result buffer frame, character height, character width, the distance between the result buffer frame and the left end of the character, and the distance between the result buffer frame and the top end of the character.

How processing is separated based on the differences between the values for these parameters will now be explained while referring to FIG. 5. In this embodiment, an explanation will be given for 24×16 (vertical×horizontal) pattern that is output after normalization. The aspect ratio for a character is a value obtained from (character height)/(character width); o_height defines the substantial height of a normalized character; o_width defines the substantial width of the normalized character; t_pad defines the distance between the upper frame of a result buffer and the top end of a character after normalization; and l_pad defines the distance between the left frame of the result buffer and the left end of the character after normalization.

First, at step 100, a character image is acquired. At step 110, (character height)/(result buffer height) is calculated by employing the parameters for the character image. When the resultant value is equal to or greater than Vh (0.5 in this embodiment), at step 120 the aspect ratio for the character is calculated. When the ratio is equal to or greater than 1.5, program control advances to step 150, whereat the character is ascertained to be vertically elongated. Therefore, the height of a normalized character is the maximum value of an output pattern, o_height=24, and o_width is 24/(aspect ratio of character).

When, at step 110, (character height)/(result buffer height) is equal to or greater than 0.5, and when the aspect ratio of the character is smaller than 1.5 and equal to or greater than 1.0, program control advances to step 160, whereat the character is ascertained to have a common size. Therefore, o_height=24 and o_width=16, which are maximum values for an output pattern.

When, at step 110, (character height)/(result buffer height) is equal to or greater than 0.5 and when the aspect ratio of a character is smaller than 1.0, program control advances to step 170, whereat the character is ascertained to be wide but short. Therefore, the character width after normalization is the maximum value of an output pattern, o_width=16, while o_height is 24×(aspect ratio of character).

When, at step 110, (character height)/(result buffer height) is smaller than Vh (0.5 in this embodiment), at step 140, (character width)/(result buffer height) is calculated. When the resultant value is equal to or greater than Vw (0.5 in this embodiment), program control goes to step 170, whereat the character is ascertained to be wide but short. Therefore, the character width after normalization is the maximum value of an output pattern, o_width=16, while o_height is 24× (aspect ratio of character).

When, at step 110, (character height)/(result buffer height) is smaller than 0.5 and when, at step 140, (character width)/(result buffer height) is smaller than 0.5, program control moves to step 180, whereat the character is ascertained to be a small, special character. Therefore, o_height=24×(1/Vh)× (character height/result buffer frame height), and o_width= 16 (1/Vw)×(character width/result buffer frame height).

After the values for o_height and o_width are acquired in the above described manner, at step 190, t_pad, which is the height of the upper blank portion of an output result buffer after normalization, and l_pad, which is the width of the left blank portion of the output result buffer, are calculated. In this case, characters, such as a hyphen "_" and a period ".", will appear as different characters depending on how large are the blank portions in the vertical directions. On the other hand, there are no characters that appear as different ones based on the size of the blank portions in the horizontal directions, and the matching is easily acquired when the character is arranged in the center with the right and left blank portions having the same width. Therefore, in the present invention, t_pad for the upper blank portion of the result buffer is calculated so as to reflect information of the location of an original character, while l_pad for the left blank portion of the character is calculated so as to place the output pattern in the center with the same distance from either side.

Thus, l_pad=(16−o_width)/2, and the character is written in the center of the result buffer. While t_pad=(24−o_ height)×(distance from upper frame of result buffer to top end of character)/(result buffer frame height−character height).

Program control then advances to step 200, and o_height, o_width, l_pad and t_pad, all of which are calculated in the above described manner as input parameters, and the character image are transmitted to the scaling program that executes the normalization. The size and location of a character pattern to be normalized are determined and the character is normalized by the scaling program. At step 210, the normalized image is output.

Figures 5, 5A:
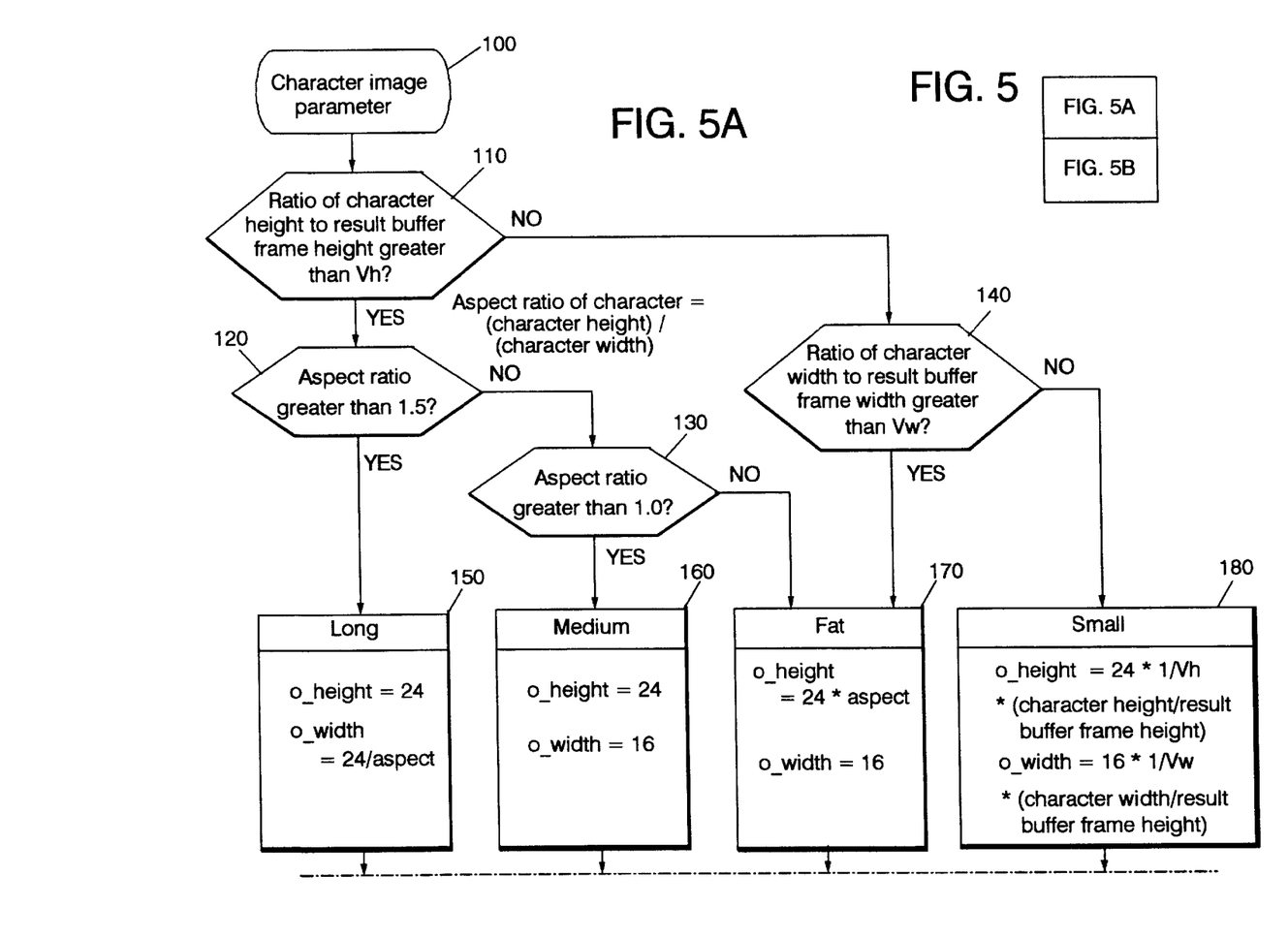
FIG. 5 is a flowchart for the processing of the present invention.
Figure 5B:
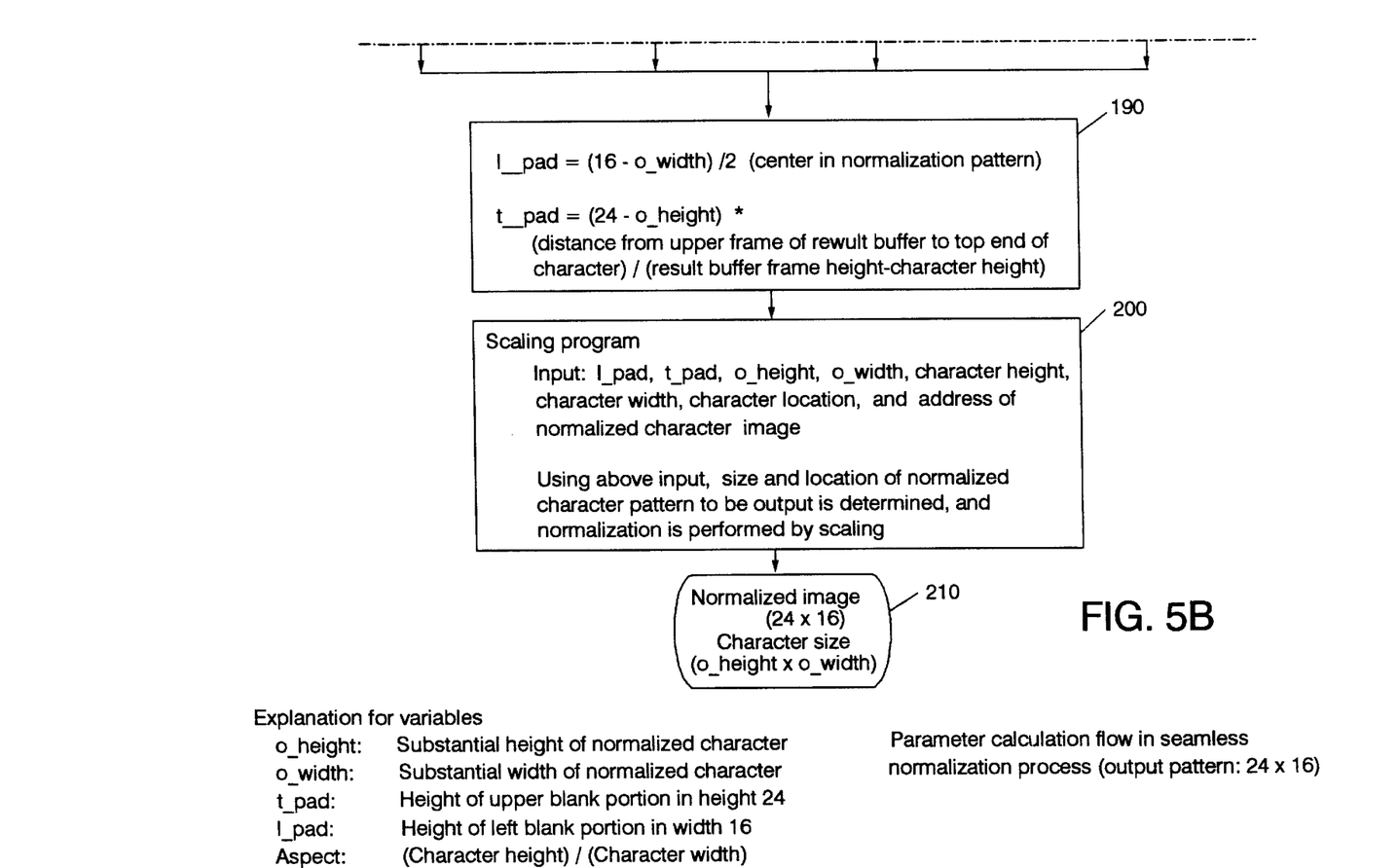

As is apparent from steps 170 and 180 in FIG. 5, within the range wherein the height of an original input character is small, o_height is increased in proportion to the height of the input character. In addition, as is apparent from steps 150 and 180, within a range wherein the width of an original character that is input is small, o_width is increased in proportion to the width of the input character. Therefore, a great change in the normalized character image will not occur due to a slight size difference of the input character. When the height and the width of an input character are equal to or greater than specified threshold values, o_height and o_width are set to the maximum values for an output pattern. As is described above, although in the present invention a threshold value is provided to change the method of calculation for parameters that are next used, the parameter values at the boundary of the threshold value are continuous. Therefore, as no discontinuities appear for these parameters at the branches, and also as no discontinuities appear in normalized images, between small characters and large characters, seamless normalization can be achieved.

Assume that when, for example, a result buffer height is 24 and an input character height is 12, i.e., when Vh is 0.5, a process for small special characters is performed at step 180 in FIG. 5. As o_height=24×(1/0.5)×(12/24)=24, even if program control jumps to another step because of a slight difference in character size, it is apparent that seamless normalization can be achieved with continuous values at the boundary between the steps.

As one of merits of the present invention, since most of the common characters, which are not particularly small and for which the aspect ratio is equal to or greater than 1.0 and smaller than 1.5, are normalized fully in an output result buffer and can be handled in the exact same size, by using this normalization method, an image appropriate for pattern matching can be acquired.

Figure 6:
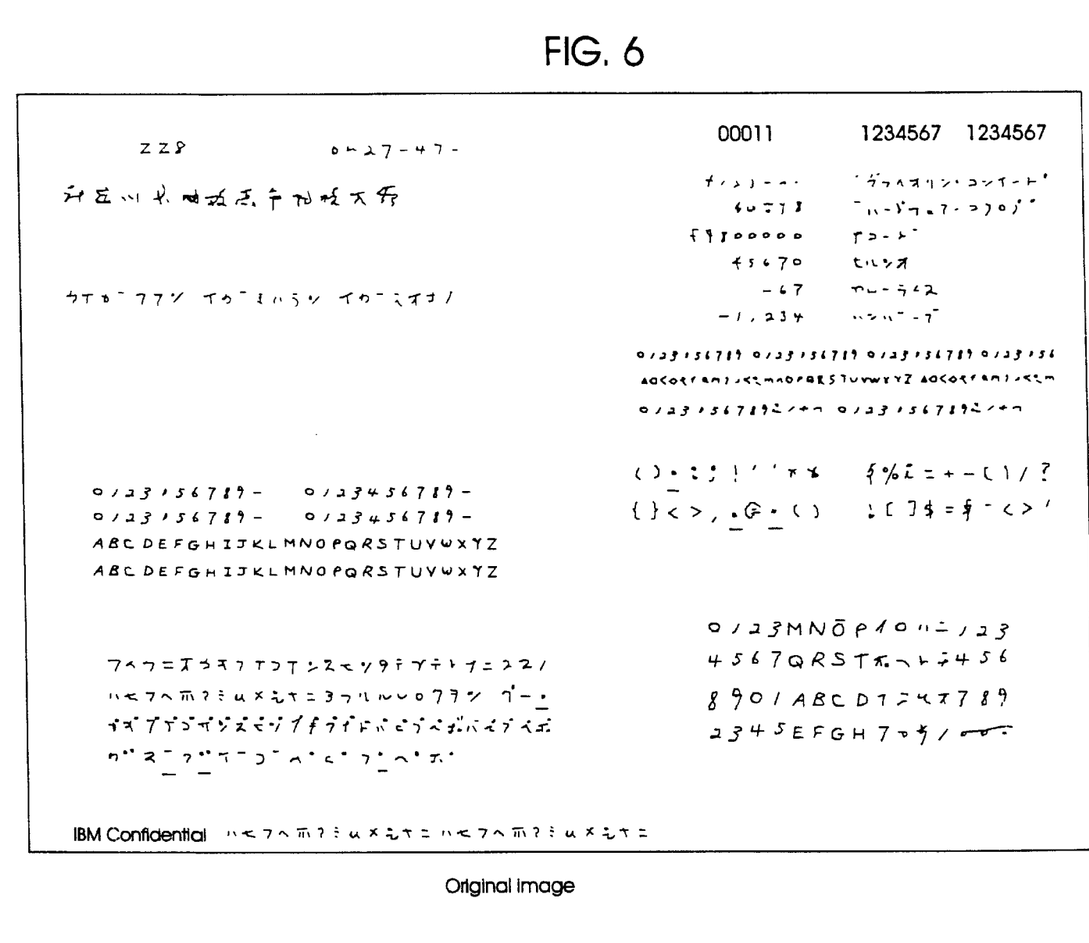
FIG. 6 is a diagram showing an original image before character recognition is performed by an OCR.
Figure 7:
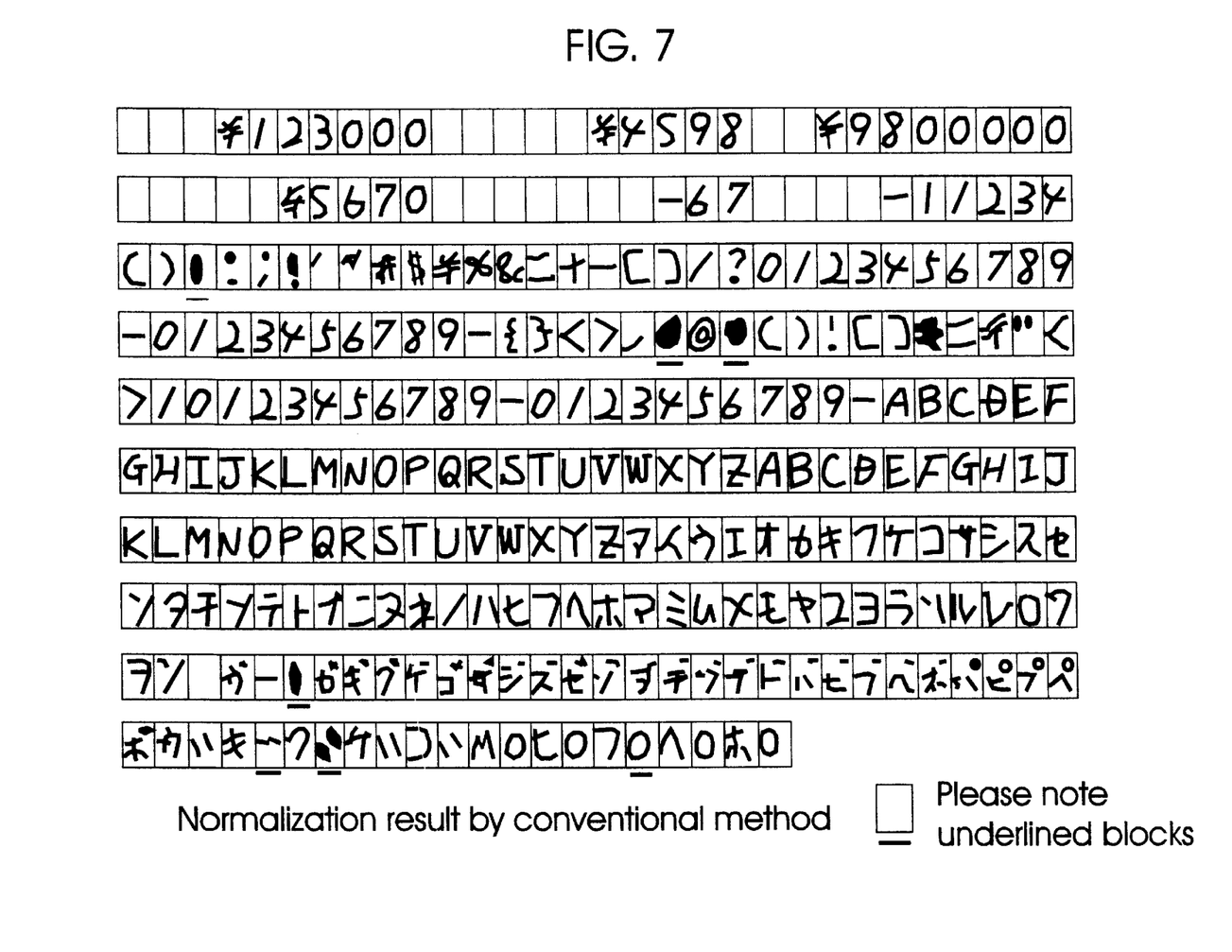
FIG. 7 is a diagram showing the result obtained after normalization by the conventional technique.
Figure 8:
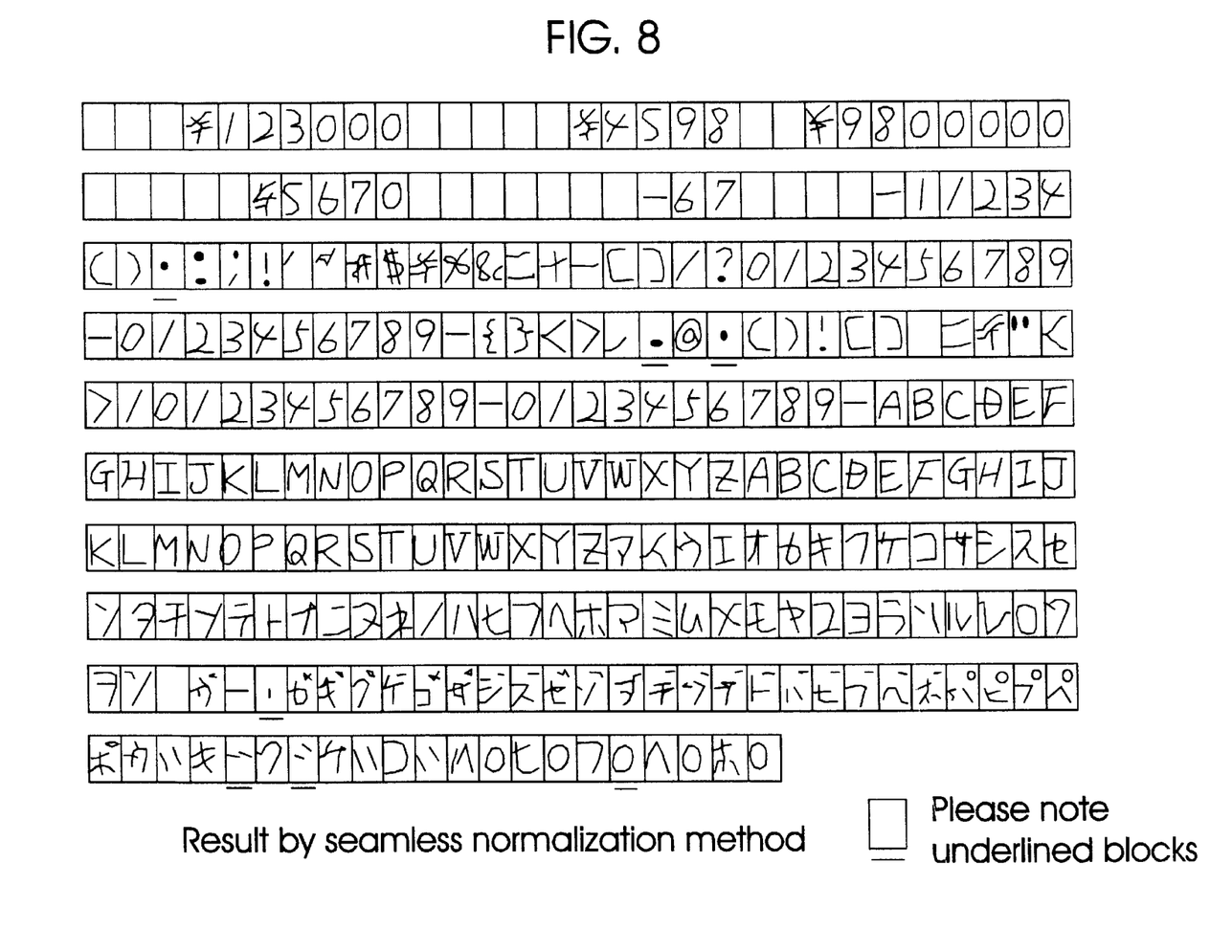
FIG. 8 is a diagram showing the result obtained after normalization by the seamless normalization method of the present invention.

In FIG. 6 is shown an original image before normalization is performed, and in FIG. 7 is shown the result of normalization provided by using conventional technique. As is apparent from FIG. 7, in the conventional normalization, when even small, special characters, such as "." and "°", exceed a threshold value, they are normalized fully in a normalization pattern, and an image that is completely different from the original image is provided. On the other hand, with the seamless normalization provided by the present invention, as is shown in FIG. 8, special characters that always appear small are normalized with appropriate sizes at appropriate locations. Therefore, the rate for character recognition can be increased.

In this embodiment, the output pattern after normalization is 24×16 (vertical×horizontal), Vh=0.5 and Vw=0.5. These are merely examples, and it would be obvious to one having skill in the art that the present invention is not limited to these example values.

In addition, in this embodiment an explanation has been given for a case wherein there is a four-way branch in the processing, to steps 150 through 180, in consonance with the character size.

The present invention is not limited to this example, and it is obvious that there can be multiple branches in the processing in consonance with the character size and the aspect ratio. Those skilled in the art will recognize many variations from the preferred embodiment and that some features may be used without the corresponding use of other features. Accordingly, this description should be considered as merely illustrative of the principle of the present invention and not in limitation thereof.

What is claimed is:

1. A character normalizing apparatus comprising:
   (a) means for calculating a normalization rate of an input character according to a size and aspect ratio of the input character;
   (b) means for setting the normalization rate to proportion the normalized character's size to the input character's size when the input character's size is smaller than a predetermined threshold;
   (c) means for adjusting the normalization rate to maintain the aspect ratio of the input character while scaling the normalized character's size seamlessly according to the input character's size;
   (d) means for normalizing the input character with the adjusted normalization rate;
   (e) means for locating the normalized character in the middle of a result buffer horizontally;
   (f) means for locating the normalized character vertically in the result buffer according to the vertical location of the input character;
   (g) means for outputting the normalized character.

2. The character recognition apparatus as recited in claim 1 which further comprises:
   means for setting said normalization rate so that said size of the normalized character pattern is a maximum size for the result buffer, when said size of said input character is equal to or greater than said predetermined threshold.

3. A character normalizing method comprising the steps of:
   (a) calculating a normalization rate of an input character according to the input character's size and aspect ratio;
   (b) setting the normalization rate to proportion the normalized character's size to the input character's size when the input character's size is smaller than a predetermined threshold;
   (c) adjusting the normalization rate to maintain the aspect ratio of the input character while scaling the normalized character's size seamlessly according to the input character's size;
   (d) normalizing the input character with the adjusted normalized rate;
   (e) locating the normalized character in the middle of a result buffer horizontally;
   (f) locating the normalized character vertically in the result buffer according to the vertical location of the input character;
   (g) outputting the normalized character.

4. The character recognition method as recited in claim 3 which further comprising the steps of:
   setting said normalization rate so that said size of the normalized character pattern is a maximum size for the result buffer, when said size of said input character is equal to or greater than the predetermined threshold.

* * * * *